Figure 1:
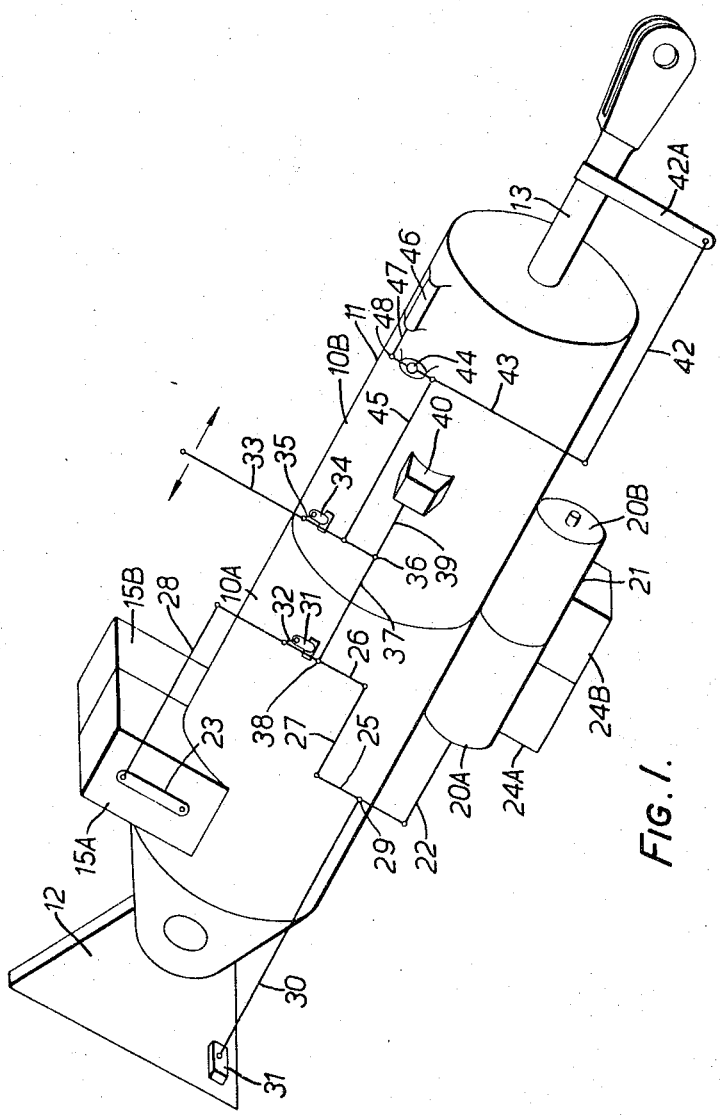

April 18, 1967  F. C. PALMER  3,314,334
SERVO SYSTEM WITH MAIN AND STANDBY CHANNELS
Filed Dec. 11, 1964  6 Sheets-Sheet 1

INVENTOR
FRANCIS C. PALMER
BY
Watson, Cole, Grindle & Watson
ATTORNEYS

April 18, 1967  F. C. PALMER  3,314,334
SERVO SYSTEM WITH MAIN AND STANDBY CHANNELS
Filed Dec. 11, 1964  6 Sheets-Sheet 3

INVENTOR
FRANCIS C. PALMER

BY
Watson, Cole, Grindle & Watson

ATTORNEYS

April 18, 1967  F. C. PALMER  3,314,334
SERVO SYSTEM WITH MAIN AND STANDBY CHANNELS
Filed Dec. 11, 1964  6 Sheets-Sheet 4

INVENTOR
FRANCIS C. PALMER
ATTORNEYS

United States Patent Office 3,314,334
Patented Apr. 18, 1967

3,314,334
SERVO SYSTEM WITH MAIN AND STANDBY CHANNELS
Francis C. Palmer, Heston, England, assignor to Fairey Engineering Limited, Heston, England, a company of Great Britain
Filed Dec. 11, 1964, Ser. No. 417,629
Claims priority, application Great Britain, Dec. 12, 1963, 49,217/63
7 Claims. (Cl. 91—438)

This invention relates to duplicated servo systems, and an object of the invention is to provide such a system in a form in which the effects of a failure of either channel will be minimised.

The present applicants' U.S. patent application Ser. No. 109,345, now Patent No. 3,220,317, describes a duplicated servo system, in which two servo motors act simultaneouslly on a common driven member, the motor of one channel being more powerful than the motor of the other channel so as to override it in the event of a fault in the latter channel, and means is provided for putting the motor of the first channel out of action in the event of a failure of that channel. Thus the arrangement enables both channels to be permanently energised in readiness for immediate service, but ensures that in normal service the motor of one channel will be dominant and will be capable of overriding the motor of the other channel to prevent malfunctioning of the whole system arising out of a failure in the over-ridden channel. Accordingly, if a malfunctioning of the duplicated system is sensed, either automatically or by an operator, it will be apparent that this can only arise out of a fault in the dominant channel, and steps can be taken immediately to put the dominant motor out of action so that the already energised minor channel will be instantly brought into operation to provide standby control of an authority as great as that of the dominant channel.

The present invention is concerned with providing another form of duplicated servo system in which both servo control channels are permanently energised and in which one control channel is normally dominant over the other control channel but can be rendered inoperative in the event of a fault to allow the standby channel to take over control, but which does n ᴧ rely on the provision of servo motors of unequal size one of which is arranged to mechanically override the other.

According to the present invention, a duplicated servo system includes two control channels, referred to as the main and standby channels, which are both normally permanently energised and which incorporate respectively two servo motors, which may be of equal power, whose outputs are both coupled to a common driven member, means for putting the main motor out of action in the event of a fault in the main control channel, and bypassing means for rendering the standby motor ineffective to drive the driven member without de-energising the standby channel, the bypassing means being normally held in its operative condition by means controlled by the main channel so long as the main motor remains in action but being automatically rendered inoperative so as to bring the standby motor into action in response to the operation of the means for putting the main motor out of action.

Thus where the duplicated servo system comprises two electro-hydraulic control channels incorporating valve-controlled hydraulic motors, a separate bypass valve is connected across each hydraulic motor, the bypass valve of the main motor being normally held closed and the bypass valve of the standby motor being normally held open, both by the hydraulic pressure of the supply to the main motor, but the bypass valve of the standby motor being automatically closed and that of the main motor being automatically opened, each by the hydraulic pressure of the supply to the standby motor or by spring return, in response to the interruption of the supply to the main motor.

Thus in one form of the invention the two bypass valves are provided with a shuttle valve having movable piston members of different areas which are directly opposed to one another, the standby valve being normally held open by the differential pressure acting on the combined piston members so long as the supply pressure to the main motor remains, but closing automatically under the standby supply pressure in response to an interruption of the supply pressure to the main motor which allows the main bypass valve to close.

Figure 2:
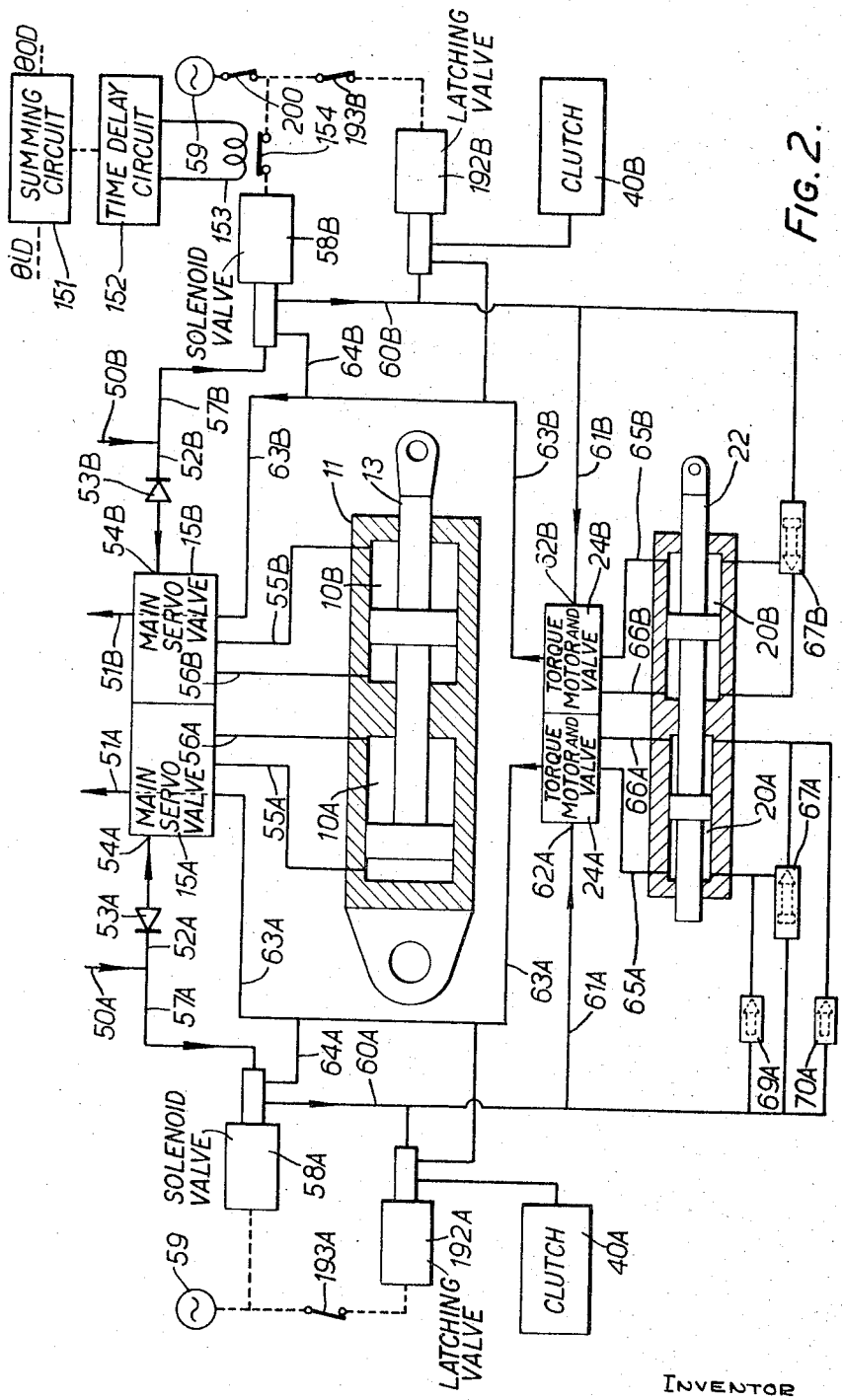
Figure 3:
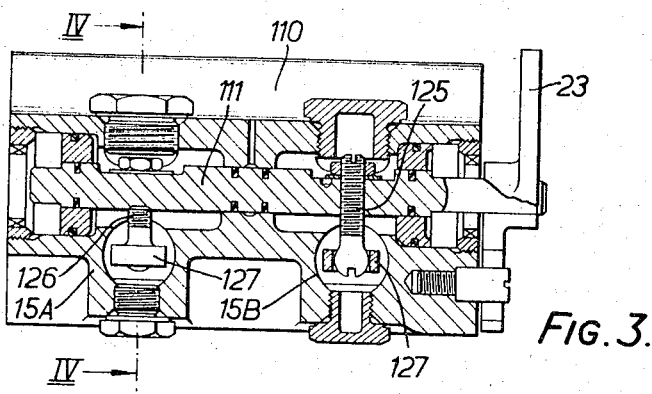
Figure 4:
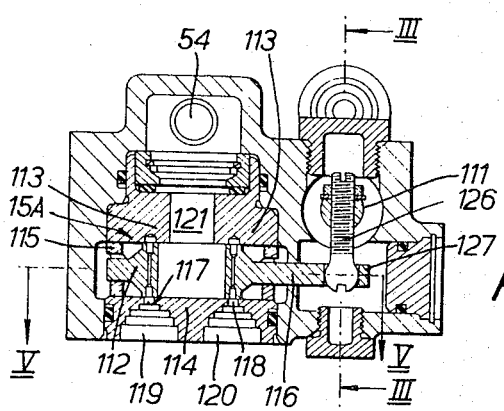
Figure 5:
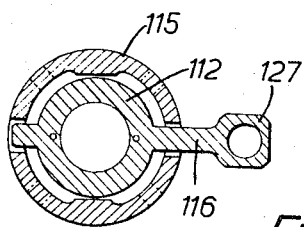
Figure 6:
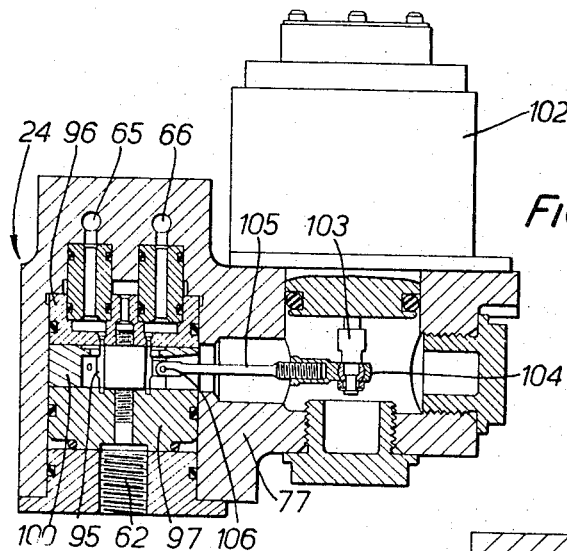
Figure 7:
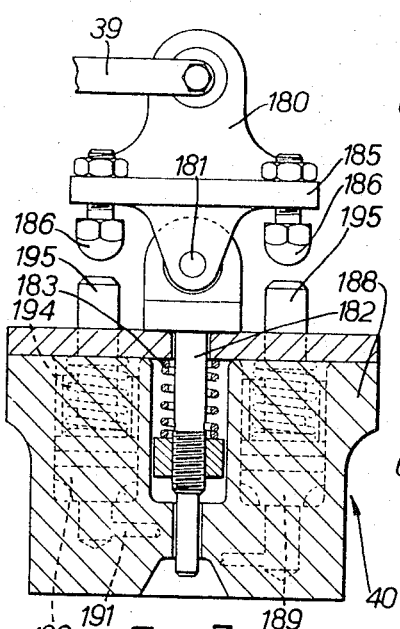
Figure 9:
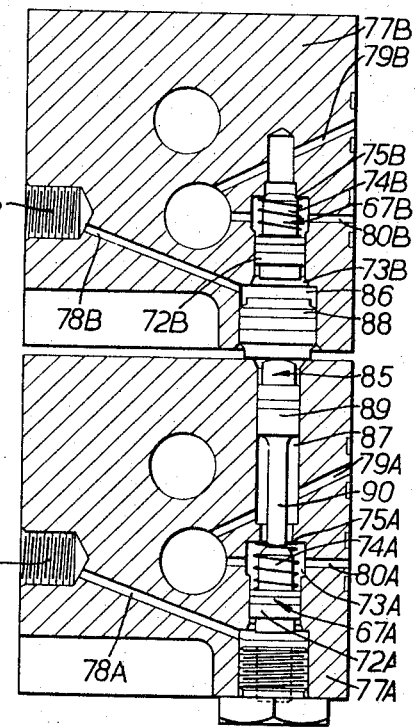
Figure 8:
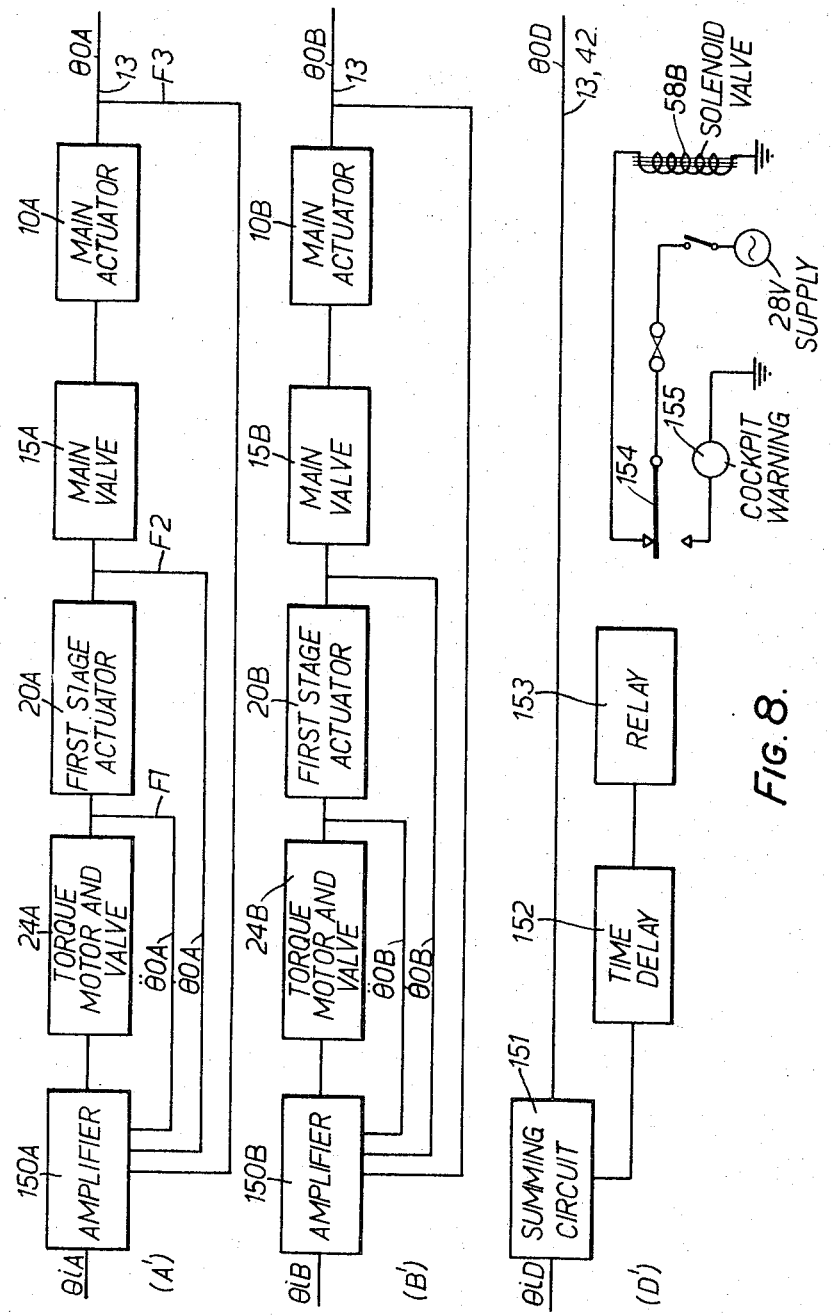
Figure 10:
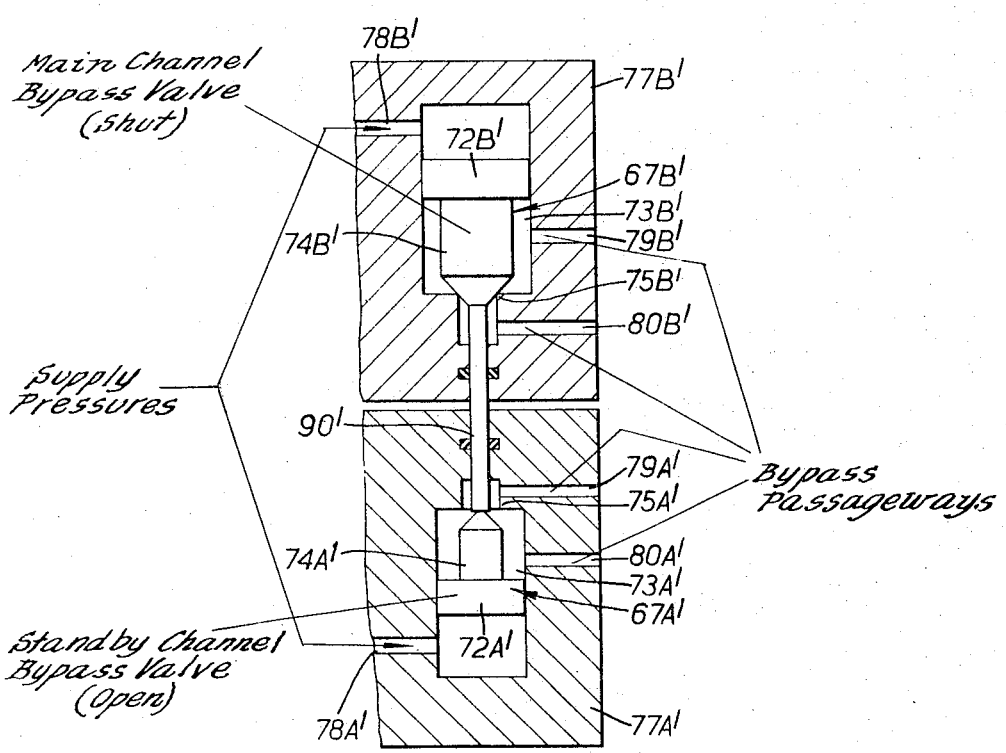

The invention may be carried into practice in various ways but one specific embodiment will now be described by way of example with reference to the accompanying drawings, in which:

FIGURE 1 is a diagram illustrating the mechanical arrangements of movable parts and their mechanical interconnections in a duplicated control system for an aircraft, FIGURE 2 is a diagram of the hydraulic circuit of the arrangement of FIGURE 1, FIGURE 3 is a cross-sectional view of the twin hydraulic second-stage servo valves of the arrangement of FIGURE 1, in section on the line III—III of FIGURE 4, FIGURE 4 is a section on the line IV—IV of FIGURE 3, FIGURE 5 is a fragmentary section on the line V—V of FIGURE 4, FIGURE 6 is a view in section of one of the first-stage electro-hydraulic control valves, FIGURE 7 illustrates the circuit control clutch for the system of FIGURES 1 and 2, FIGURE 8 is a block diagram of the control circuits of the system of FIGURES 1 and 2, FIGURE 9 is a sectional view of the bypass valve arrangement for the first-stage jacks of the system of FIGURES 1 and 2, and FIGURE 10 is a fragmentary sectionl view of a modification of the bypass valve arrangement for the first-stage jacks of the system of FIGURES 1 and 2.

In the illustrated embodiment the invention is applied to a duplicated hydraulic servo system for the automatic control of a high-speed low-flying aircraft. The general form and arrangement of the control system are similar to those of the system described and illustrated in the aforesaid U.S. Patent No. 3,220,317 the system comprising duplicated control channels each having two stages, of which the second stage provides power operation under either manual or automatic control and comprises a hydraulic control valve, which may be selected by a manual operating member such as the pilot's control column, and which controls the flow of pressurised hydraulic fluid to and from a second-stage hydraulic jack mechanically connected to an associated movable control surface of the aircraft. The second-stage jacks and their associated valves are thus duplicated in the two control channels, although the two jacks are arranged in tandem with their pistons acting on a common piston rod. The second-stage control valves are mounted on the jack casings and are provided with a mechanical feed-back. Thus if the control column is moved the second-stage valves will be actuated to admit fluid to the associated jacks, and this will shift the control surface and at the same time restore the valves to their closed position to stop further movement of the control surface.

The arrangement of the mechanical parts of the system is illustrated diagrammatically in FIGURE 1. A tandem pair of main jacks 10A and 10B share a common jack casing 11 which is earthed by being anchored at 12 to the aircraft structure. The common plunger 13 of the main jacks 10A and 10B constitutes the output member of the system which is coupled by a mechanical linkage (not shown) to the flying control surface to be actuated. Mounted on the main jack casing 11 are a pair of coupled main servo valves 15A and 15B which control the actuation of the main jacks 10A and 10B by separate pressure fluid supplies A and B. The main servo valves 15A and 15B and the tandem jacks 10A and 10B constitute the second stage of the control system.

The first stage of the control system, which is also duplicated but functions only for automatic control, comprises in each control channel an auto-control jack 20A or 20B, the two auto-control jacks 20A and 20B being also a tandem pair sharing a single casing 21 and a single jack plunger 22 which is connected by a mechanical linkage to the operating arm 23 of the coupled main servo valves 15A and 15B. The auto-control jacks 20A and 20B are respectively controlled by means of first-stage electro-hydraulic control valves 24A and 24B mounted on the auto-control jack casing 21.

The linkage by which the plunger 22 of the auto-control jacks is connected to the main servo valves 15A and 15B comprises a pair of levers 25 and 26 interconnected at their adjacent ends by a link 27, the lever 25 being connected at its other end to the auto-control jack plunger 22 and the lever 26 being connected at its other end by a link 28 to the operating arm 23 of the second-stage servo valves 15A and 15B. The lever 25 is pivoted at an intermediate point 29 of its length to a structural feed-back rod 30 anchored at 31 to the aircraft structure. The lever 26 is linked to an anchorage 31 on the main jack casing 11 by an idler lever 32 which permits a small amount of backlash. The manual input lever 33 connected to the pilot's control column is linked to an anchorage 34 on the main jack casing 11 by an idler lever 35 which also permits a small amount of backlash, and the lever 33 is pivotally connected at its end 36 by a link 37 to a point 38 of the lever 26 between the anchorage 31 and the link 37. The end 36 of the manual input lever 33 is also connected by an extension 39 of the link 37 to a hydraulic circuit clutch 40 mounted on the main jack casing 11, which is shown in greater detail in FIGURE 7.

A main feed-back rod 42 which is connected by an arm 42A to the output plunger 13 of the main jacks 10A and 10B is pivoted at its other end to one end of a main feed-back lever 43 pivoted at an intermediate point 44 of its length to the jack casing 11. An intermediate point of the manual input lever 33 adjacent to its end 36 is connected by a link 45 to the feed-back lever 43. Backlash in the bearing points of the feed-back lever 43 and of the main feed-back rod 42 are loaded out by a spring housed in a housing 46 on the casing 11 and connected by a link 47 to the projecting end 48 of the feed-back lever 43, so that the spring load is felt only by the plunger 13 of the main jacks. The various links 30, 37 and 45 incorporate springs (not shown) which load out the backlash of the various bearings of the linkage against one another so that these backlashes are not felt externally.

Thus it will be appreciated that the main servo valves 15A and 15B can be directly operated manually by the input lever 33 overriding the automatic control of the first stage constituted by the auto-control jacks 20A, 20B and their electro-hydraulic valves 24A, 24B: and that when auto-control is selected, the auto-control jack 20A or 20B of the selected control channel will operate the main servo valves 15A and 15B to actuate the main jack 10A or 10B of the selected control channel, and the main feed-back linkage 42, 43, 45 will feed back the resultant output movement of the plunger 13 to the manual input lever 33 and to the lever 26. It will be observed that the main feed-back lever 43 is directly earthed to the main jack casing 11, so that a given position of the output plunger 13 and of the flying control coupled to it will result in one, and only one, position of the feed-back lever 43.

It will be appreciated that the levers 26 and 33 are mechanically stabilised off the casing 11 of the main jack by the idler levers 32 or 35, but it is to be noted that the backlash of the bearings in the idler levers does not represent a discontinuity in the control circuit.

The hydraulic circuit associated with the system illustrated in FIGURE 1 is shown in FIGURE 2. The inlet pipes for the duplicated hydraulic pressure system A and B are indicated at 50A and 50B and the corresponding return pipes at 51A and 51B. The pressure systems A and B are respectively connected through lines 52A and 52B and non-return valves 53A and 53B to the inlet ports 54A and 54B of the two main servo valves 15A and 15B, each of which is connected by lines 55A, 56A or 55B, 56B to opposite ends of one of the two main jacks 10A and 10B.

The supplies A and B are also delivered through lines 57A, 57B to the inlets of a pair of solenoid-operated selector valves 58A, 58B, respectively energised from a 28 volt supply indicated at 59. So long as each selector valve 58A or 58B is energised it delivers the supply pressure of the corresponding system through branch lines 60A, 61A or 60B, 61B to the inlet 62A or 62B of the respective first-stage electro-hydraulic valve 24A or 24B associated with the supply. The return line from each first-stage valve is indicated at 63A or 63B, and leads via the associated second-stage valve 15A or 15B to the main return line 51A or 51B. A branch line 64A or 64B from the other delivery port of each selector valve 58A, or 58B connects the respective supply system to the return line 63A or 63B and so bypasses the first-stage valve 24A or 24B when the selector valve is de-energized.

The delivery ports of the first-stage electro-hydraulic valves 24A and 24B are connected by lines 65A, 66A or 65B, 66B to opposite ends of the two first-stage auto-control jacks 20A and 20B, so that the latter are actuated from the respective pressure systems under the control of the first-stage valves 24A, 24B. Moreover a pressure-actuated bypass valve 67A is connected between opposite ends of the first-stage auto-control jack 20A, and a pressure-actuated bypass-valve 67B is connected between opposite ends of the auto-control jack 20B, so that whenever one of the bypass valves is open it bypasses the associated auto-control jack and puts it out of operation. Non-return pressure relief valves 69A, 70A are also connected between the respective opposite ends of the auto-control jack 20A, one on either side of the bypass valve 67A, and the pressure line 60A leading from the selector valve 58A.

As shown in detail in FIGURE 9, the movable member of each bypass valve 67A or 67B comprises a piston 72A or 72B slidable in a valve chamber 73A and 73B and carrying an extension 74A or 74B which constitutes the valve closure member and co-operates with the valve seating 75A or 75B. The pistons 72A and 72B are of equal effective area, and the respective system pressure A or B is supplied to the interior of each valve chamber 73A or 73B on the side of the piston remote from the valve seating, so that each bypass valve is normally pressure-biased by the respective system pressure in the closing direction against the force of a light return spring. The bypass valves are housed in the closely-adjacent valve blocks 77A and 77B of the two electro-hydraulic valves 24A and 24B, and the system pressures are supplied to the chambers 73A, 73B through galleries 78A, 78B leading from the inlet sockets 62A, 62B of the valves 24A and 24B. Bypass galleries 79A and 80A in the valve block 77A intersect the valve chamber 73A on opposite sides of the valve seating 75A and lead to passages in the jack casing 21 communicating with opposite ends of the auto-control jack 20A, and a similar arrangement of bypass galleries 79B and 80B is provided in the other valve block 77B.

A hydraulic shuttle valve 85 is interposed between the two bypass valves 67A and 67B and is housed in intercommunicating coaxial chambers 86 and 87 formed in the valve blocks 77A and 77B. The chamber 86, which is of larger cross-sectional area than the chamber 87, is formed as an extension of the bypass valve chamber 73A, and the chamber 87 is formed as an extension of the bypass valve chamber 73B. The shuttle valve 85 comprises a large piston 88 at one end which slides in the larger chamber 86, and a smaller piston 89 which slides in the other chamber 87. The shuttle valve 85 also carries a snout 90 which extends into the bypass chamber 73A into contact with the end of the bypass valve member 74A. The pistons 88 and 89 are free pistons which slide in their respective chambers 86 and 87, the snout 90 being carried by the smaller piston 89.

The supply pressure of system B in the chambers 73B and 86 normally holds the bypass valve 67B closed, so that the auto-control jack 20B is operative, and also acts on the face of the free piston 88. The supply pressure of the system A acts on the outer face of the bypass valve piston 74A in contact with the snout 90, so that the two free pistons 88 and 89 are normally held in abutted relationship as shown in FIGURE 9, with the smaller piston 89 driven outwardly to cause its snout 90 to hold the bypass valve 67A open, thus bypassing the auto-control jack 20A. This situation will exist so long as the pressure of system B remains effective in the chambers 73B and 86. However on the collapse of the supply pressure of system B in the chambers, for example due to the de-energisation of the solenoid-operated selector valve 58B, the pressure of the system A acting in the valve chamber 73A on the bypass valve piston 74A will take over, and will close the bypass valve 67A and move the free pistons 88 and 89 in the corresponding direction, and the other bypass valve 67B will be opened by its return spring to bypass the auto-control valve 20B leaving the auto-control valve 20A operative.

It will be observed that the two auto-control first-stage jacks 20A and 20B are not the same size, the effective piston area of the jack 20B being slightly more than twice that of the jack 20A. To compensate for this, the electro-hydraulic first-stage valve 24B is so designed that in response to a given electrical input signal it will open to approximately twice the extent that the valve 24A would open for the same input signal. Thus a particular input signal supplied to each of the two torque-motors which operate the valves 24A and 24B will produce equal movements of the corresponding auto-control jacks 20A and 20B. This is achieved by giving the two otherwise identical torque motors correspondingly different crank-arm radii to actuate the associated hydraulic servo valves. The ratio of the torque-motor crank arms must take into account the variation of port area with displacement, and also flow-induced forces which affect the displacement of the torque motors.

Alternatively the torque-motor crank arms might be identical and the two auto-control jacks might be of equal effective area and power.

The construction of each of the first-stage electro-hydraulic valves 24A and 24B is illustrated in FIGURE 6. The valve is of the pressure-balanced slide type, having a valve slide 95 of annular form which slides between two opposed parallel plane ported platens 96 and 97 separated by a spacer 100 within the valve block 77. The valve delivery passages for connection to the auto-control jack are indicated at 65 and 66, and the pressure inlet socket at 62. The torque-motor 102 has a crank arm 103 whose outer end engages in an eye 104 of an operating plunger 105 pivoted at 106 to the valve slide 95.

FIGURES 3 to 5 illustrate the construction of the coupled second-stage servo valves 15A and 15B, which share a common valve block 110 and a common operating spindle 111 to one end of which the operating arm 23 is attached. Each valve is of the fully-pressure-balanced slide type, having an annular valve slide 112 whose profile is shown in FIGURE 5 and which slides between plane parallel upper and lower ported platens 113 and 114 separated by an annular spacer 115. Each valve slide 112 carries an operating rod 116 and co-operates with ports 117, 118 in the platen which communicate respectively with the delivery outlets 119, 120 of the valve to which the pressure lines 55 and 56 lead from the associated main jack 10A or 10B. The pressure inlet 54 of the valve leads via a passage 121 to the central region within the annular valve slide, and the region outside the valve slide between the platens is vented to return. The operating spindle 111 carries two spaced, depending ball-ended radial pins 125 and 126 whose outer ends are respectively engaged in the eyes 127 at the ends of the two valve slide rods 116, so that the rotation of the spindle 111 by the operating arm 23 effects the sliding movement of both valve slides between their platens so as to operate both the valves 15A and 15B simultaneously, thus producing simultaneous actuation of both main jacks 10A and 10B by the respective pressure systems A and B.

The control circuits for the hydraulic systems will now be described in detail with references to FIGURE 8, which shows diagrammatically the three separate control channels A', B' and D. The control channels A' and B' are identical and are associated respectively with the hydraulic pressure systems A and B. The control channel A' comprises an amplifier 150A to whose input a demand signal $\theta iA$ is supplied from the auto-pilot corresponding to the required angular displacement of the flying control surface. The output from the amplifier is supplied to the torque-motor of the first-stage auto-control valve 15A, which in turn actuates the auto-control jack 20A. The resultant movement of the latter operates the second-stage servo-valve 15A which actuates the main second-stage jack 10A to produce a corresponding output movement $\theta oA$ which is transmitted to the flying control surface.

In each of the channels A' and B' three feed-back loops are provided, as indicated at F1, F2 and F3 in channel A'. In the loop F1, an electrical signal $\ddot{\theta}oA$ corresponding to the output from the first-stage valve 24A and hence corresponding to the second differential coefficient of the angular position of the flying control surface, is fed back to the input of the amplifier 150A. In loop F2, a signal corresponding to the output from the auto-control jack 20A of the first stage, and hence corresponding to the rate of change of angle of the flying control surface, is also fed back to the amplifier input. In loop F3, a signal corresponding to the output movement of the main jack 10A, that is to say to the actual change of angle $\theta oA$, is fed back to the amplifier.

The second channel B' has similar components and feed-back loops to those of the channel A', but identified by the suffix letter B.

The third channel D comprises an automatic error detector circuit for putting the main control channel B' out of operation in the event of a run-away, so as to select the standby channel A' for subsequent auto-control. The channel D comprises a summing circuit 151 to which are supplied an input signal $\theta iD$ corresponding to the input $\theta iB$ to the main control channel B' (which may be derived from an additional gyro pick-off) and a signal $\theta oD$ corresponding to the output of the system to the control surface, derived from a pick-off on the main jack spindle 13. The algebraic sum of these two signals is delivered as the summing circuit output and is fed through a time delay circuit 152 to a relay 153 whose contact 154 controls the energisation of the solenoid-operated selector valve 58B from the source 59, and hence controls the hydraulic pressure supply of system B to the auto-control jack 20B in the first stage and the operation of the bypass valves 20A and 20B, as well as controlling a cockpit warning lamp 155. Accordingly the summing circuit compares the system input with its output, and if the error between them exceeds a predetermined value and persists for more than a predetermined time (as in a run-away of control channel B'), the relay 153 is automatically operated to put the control channel B' out of operation by interrupting the hydraulic supply pressure of system B to the auto-control jack 20B. This causes the automatic opening of the bypass valve 67B to reject the control channel B', and the automatic closing of the other bypass valve 67A to bring the auto-control jack 20A into operation and to transfer the control to the standby channel A'.

The pilot's manual control is required to follow any control surface movements brought about by the auto-pilot. It is therefore necessary to latch the control lever 33 to the movement of the output ram 13 whenever the auto-pilot is selected in. It is required that this should be done at any time when the auto-pilot is selected in, irrespective of the position of the auto-control jack spindle 22 which at that particular moment may be at any position in its travel due to a rate demand from the auto-stabiliser gyro, since the latter acts differentially with the pilot. The latch means must therefore gather control from anywhere in the travel available at the latching point. The point selected for latching is shown diagrammatically at 36 in FIGURE 1 and the clutch 40 used for this purpose is illustrated in detail in FIGURE 7. The clutch 40 comprises a rocking lever 180 pivoted at 181 to the upper end of a plunger 182 spring-loaded by a spring 183 in the downward direction. The upper end of the rocking lever 180 is pivoted at 184 to the link 39 leading to the latching point 36. The rocking lever 180 will thus continuously follow in its pivotal movement the differential movements of the latching point 36, and there is no question of having to return it to a particular position before the latch can be engaged, as would be the case if a latch-pin were employed. The rocking lever carries rigidly attached to it an earthing plate 185 carrying four adjustable tappets 186 arranged at the four corners of a rectangle (only two of the tappets 186 are visible in the elevation of FIGURE 7). Mounted in the base 188 in which the plunger 182 slides are four hydraulically-operated pistons 189 (only two of which are visible in the elevation of FIGURE 7), each opposite one of the tappets 186. One pair of diagonally-opposite pistons 189 is connected by passages 190 to the hydraulic pressure system A, and the other pair of diagonally-opposite pistons 189 is connnected by passages 191 to the other system B. The actuation of the respective pairs of diagonally-opposite pistons is controlled by two solenoid-operated latching valves 192A and 192B (FIGURE 2) also supplied from the 28 volt source 59 through switches 193A and 193B. When the hydraulic pressure of the respective system is selected to either pair of diagonally-opposite pistons 189 by the closing of the respective switch 193A or 193B to energise the associated selector switch 192B or 192A, the pistons will be raised against the force of their return springs 194 so that their piston rods 195 will move into operative relationship with the associated adjustable tappets 186. The setting of the tappets 186 is not critical within thousandths of an inch, the tappets being set so that when a pair of diagonally-opposite pistons 189 is pressurised the engagement of the piston rods 195 with the corresponding tappets 186 will slightly raise the plunger 182 against the compression spring 183. The load setting of the plunger spring 183 is determined by the control characteristics and the break-out force specified for the pilot to exert on his manual control column to override the auto-pilot.

With one or each pair of diagonally-opposite pistons 189 pressurised to engage the corresponding tappets 186, a load in excess of a predetermined value applied through the link 39 to rock the lever 180 will cause the lever 180 to pivot about the two dome-ended tappets 186 on the corresponding side of the earthing plate 185, causing the plunger 182 to lift against the force of the pre-stressed compression spring 183. When the breaking out of the spring 183 occurs, the corresponding movement of the rocking lever 180 and associated linkage operates a microswitch circuit (not shown) which rejects the auto-pilot control.

Thus the clutch 40 when actuated by the closing of one or both of the switches 193A, 193B will latch the pilot's control column to the auto-control linkage acting on the second-stage servo valves in a way which causes the pilot's control column to follow the operating movements fed into the second-stage servo valves by the auto-control jacks, and also the mechanical feed-back movements from the output plunger 13 of the main jacks, the clutch also permitting the pilot to override and reject the auto-pilot control simply by exerting a sufficient force on the manual control column to cause the spring-loaded plunger 182 to break out.

The automatic control system described and illustrated has full authority, that is to say it can move the associated flying control surface through the full range of movement available to the pilot. Any failure of a control system having full authority may be very serious, especially when the aircraft which it controls is intended to fly at high speed and low altitude. The danger arising from a fault in a full-authority control system is not overcome by the mere duplication of the control channels of the system.

Thus if a fault occurs in one channel of a conventional duplicated control system, and the first-stage jack of that channel attempts to produce an improper operation of the flying control surface, the first-stage jack of the other channel which is not faulty would oppose this improper movement. If the two first-stage jacks were equally powerful the jack of the non-faulty channel might be able to prevent the improper movement of the flying control surface, but would be unable to prevent any movement in the opposite direction. Hence whenever a signal was received by the non-faulty channel calling for movement in the same direction as the movement which the faulty channel was attempting to produce, that movement would occur, but whenever a signal calling for a contrary movement was received by the non-faulty channel, no movement would occur. Hence the result would be a ratchet-type of movement whereby the combined system would drift in the runaway sense. The system could then only be returned to neutral by the pilot determining which channel was faulty and putting it out of action, or putting the first stages of both control channels out of action simultaneously and reverting to manual control. The latter is clearly undesirable since the automatic control system forms a vital link in the control chain which permits a high-speed low-altitude military aircraft to fulfill its mission under all operational conditions.

It is not a simple matter to determine which control channel is faulty, since the main electrical feed-back even though it may be duplicated will normally give the same signal to both control channels, being itself controlled by the output of the single ram of the main jack.

To overcome this difficulty, the two first-stage jacks of the specific embodiment described above and illustrated are provided with the pressure-responsive hydraulic bypass valves 67A and 67B, each of which when open will bypass the associated auto-control jack 20A or 20B and render it inoperative, notwithstanding that the full hydraulic pressure of the associated system A or B remains supplied to the jack through its associated first-stage control valve 24A or 24B; and moreover as described the pressure-responsive bypass valves 67A and 67B are associated with the hydraulic shuttle valve 85, which holds open the bypass valve 67A of the first-stage jack 20A in the standby channel A', so long as the hydraulic pressure of the main system B remains supplied to the bypass valve 67B associated with the auto-control jack 20B in the main channel B'. Thus under normal conditions the standby first-stage jack 20A will remain bypassed and ineffective so that it will not respond to demands transmitted to it by the associated first-stage control valve 24A. However under these conditions the main channel first-stage auto-control jack 20B, whose bypass valve 67B is held closed by the main system pressure B, will continue to function normally to operate the second control stage of channel B' in response to demands transmitted from the auto-pilot. If a fault should develop in the still pressurised standby control channel A', this will not affect the control of the aircraft because the first-stage jack 20A of the standby channel A' is bypassed.

Accordingly in normal operation both control channels A' and B' function simultaneously with the standby first-stage jack 20A bypassed. If a malfunctioning of the controls is sensed either by the pilot through the manual control column, or automatically by the third control channel D, it will be clear that this must be due to a fault in the main control channel B'. No further investigation or discrimination is necessary in order to determine that what is needed is to render the main control channel B' inoperative by interrupting the hydraulic supply pressure of system B to the main first-stage jack 20B, whereupon the standby control channel A' will take over automatically as the bypass valve 67A of the standby jack 20A closes, and will continue to exercise proper control.

The pilot is provided with a manual switch 200 controlling the circuit of the solenoid-controlled valve 58B which controls the supply to the bypass valve 67B, so that the main channel B' can be put out of action manually by the pilot in the event of a fault.

In one example of the operation of the three auto-control channels A', B', D, an error of approximately 1 part in 200 between the demand signal and the output in channel A' or B' generates the full signal at the first-stage valve 15A or 15B. Allowing a fair margin to prevent inadvertent rejection of the main channel B', an error of say 1 part in 100 detected by the third channel D could be used to put the main channel out of action. On a 30° travel this represents only 0.3° of flying control surface deflection, so that with this system the occurrence of a single runaway in either channel A' or B' in any one flight is reduced in effect from a great potential hazard to a short-lived malfunction of no more than nuisance value.

In a control system of the general type in question many different faults can occur in theory, but with the system described and illustrated employing a main and a standby control channel and a third control channel constituting a closed-loop detector circuit to sense a malfunction, it is extremely unlikely that any fault will produce a serious result. In fact the system offers most of the advantages of a completely triplicated system, with greatly reduced weight and complexity.

Since the first-stage jacks 20A and 20B are normally working in low-load circuits, the power absorbed in the continued bypassing of one or other of the first-stage jacks is not significant, and in fact is not substantially different from that involved in the arrangement of the aforesaid U.S. patent application No. 109,345 in which arrangement it is impossible in practice to match the hydraulic circuits associated with the two mechanically-coupled first-stage jacks of different power sufficiently closely to prevent the nearly continuous blowing of fluid through the bypass valve of the smaller jack.

In a modification of the bypass valve arrangement for the first-stage jacks as shown in detail in FIGURE 10, the two bypass valves 67A' and 67B' associated respectively with the first-stage auto-control jacks 20A and 20B are provided with movable valve members 74A' and 74B' carrying pistons 72A' and 72B' of unequal area sliding in co-operating cylinders 73A' and 73B', the effective area of the piston 72B' of the main channel bypass valve 67B' being greater than the area of the piston 72A' of the standby channel bypass valve 67A', and the main and standby hydraulic supply pressures being admitted respectively to 73A' or 73B' to act on the faces of the pistons 72A' and 72B' in the direction tending to close the bypass valves and hold them closed. However the movable valve member of the main bypass valve 67B' is provided with an elongated extension or snout 90' which projects into the valve chamber 73A' of the standby bypass valve 67A' into contact with the end of the movable valve member 74A' of the standby valve 67A' remote from its associated piston 72A'. The arrangement is such that so long as the main system supply pressure B acts on the piston 72B' of the main system bypass valve 67B', it holds the latter valve closed and causes the snout 90' to lift the movable valve member 74A' of the standby bypass valve 67A' off its seating 75A' against the pressure of the standby system A acting on the smaller piston 72A', thus holding the standby bypass valve 67A' open. In the event of an interruption in the main supply pressure B to the main system bypass valve 67B', the standby supply pressure A acting on the small piston 72A' of the standby bypass valve 67A' will prevail, and will close the standby bypass valve 67A' and open the main system bypass valve 67B', thus rejecting the main control channel and selecting the already energised standby control channel.

What I claim as my invention and desire to secure by Letters Patent is:

1. A duplicated servo system which includes two control channels, referred to as the main and standby channels, which are both normally permanently energised and which incorporate respectively two servo motors whose outputs are both coupled to a common output member, means for putting the main motor out of action in the event of a fault in the main control channel, and bypassing means for bypassing the standby motor to render it ineffective to drive the output member but without de-energizing the standby channel, the bypassing means being normally held in its operative condition, in which it bypasses the standby motor, by means controlled by the main channel so long as the main motor remains in action but being automatically rendered inoperative so as to bring the standby motor into action in response to the operation of the means for putting the main motor out of action.

2. A servo system as claimed in claim 1 in which the control channels are electro-hydraulic channels and in which the servo motors are valve-controlled hydraulic motors, and which includes separate main and standby bypass valves connected respectively across the main and standby hydraulic motors, the main bypass valve of the main motor being the said means for putting the main motor out of action and being normally held closed, and the standby bypass valve of the standby motor being normally held open, both by the hydraulic pressure supply to the main motor, but the standby bypass valve of the standby motor being automatically closed by the hydraulic pressure of the supply to the standby motor and the main bypass valve of the main motor being automatically opened by return spring means, both in response to an interruption of the main motor hydraulic supply pressure acting on the main bypass valve.

3. A servo system as claimed in claim 2 in which the movable valve members of the two bypass valves are associated with pistons of different areas which are directly opposed to one another, and which are subjected respectively to the hydraulic pressures of the main and standby supplies, the standby bypass valve being normally held open by the pressure acting on the main valve piston so long as the supply pressure to the main motor remains, but closing automatically under the standby supply pressure to open the main valve in response to an interruption of the main motor supply pressure acting on the piston associated with the main bypass valve.

4. A servo system as claimed in claim 3 which includes a hydraulically-actuated valve shuttle which is constituted by opposed pistons of different effective areas, the shuttle being interposed between the opposed movable valve members of the two bypass valves to operate them differentially, the standby bypass valve being normally held open by the shuttle under the differential pressure acting thereon so long as the main motor supply pressure remains, but closing automatically under the standby supply pressure when released by the shuttle in response to an interruption of the main motor supply pressure acting on the shuttle.

5. A servo system as claimed in claim 2 in which the means for putting the main servo motor out of action comprises means operating automatically in response to the occurrence of an error of a predetermined value between a demand movement and a resultant output movement, for example the input and output respectively of the complete servo system.

6. A servo system as claimed in claim 5 which includes a third control channel constituting a detector circuit arranged to produce an error signal constituting the algebraic sum of signals corresponding to the demand movement and the attained output movement, the detector circuit including also means actuated automatically in response to an error signal exceeding a predetermined value to reject the main control channel and to bring the standby control channel into operation by causing an interruption of the main motor supply pressure acting on the main bypass valve.

7. A servo system as claimed in claim 1 which comprises an automatic hydraulic control system for the flying controls of a high speed aircraft.

References Cited by the Examiner
UNITED STATES PATENTS

| 3,098,412 | 8/1961 | Reitman | 91—367 |
| 3,190,185 | 6/1965 | Rasmussen | 91—363 |
| 3,220,317 | 11/1965 | Fuell | 91—411 |

MARTIN P. SCHWADRON, *Primary Examiner.*

P. E. MASLOUSKY, *Assistant Examiner.*